Patented May 23, 1950

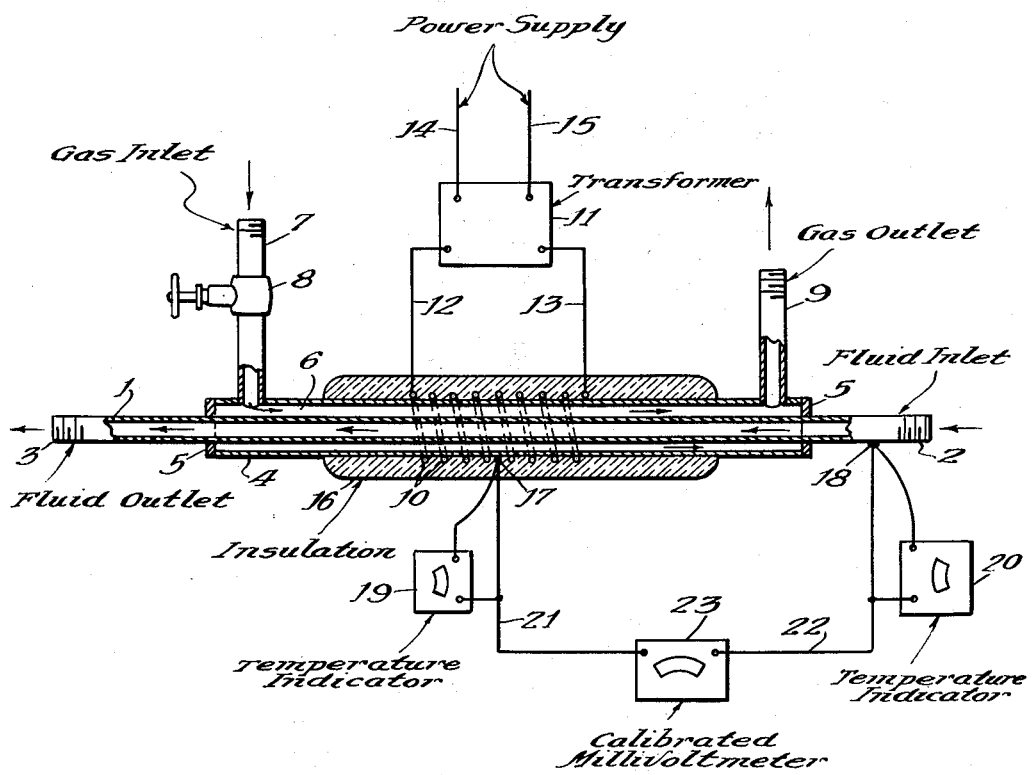

2,508,572

UNITED STATES PATENT OFFICE 2,508,572

GAS ANALYZING APPARATUS

Herbert A. Hulsberg, Hinsdale, Ill., assignor to Universal Oil Products Company, Chicago, Ill., a corporation of Delaware Application January 31, 1946, Serial No. 644,589

5 Claims. (Cl. 73—25)

This invention relates to an improved and simplified form of gas analyzer. More specifically the improved apparatus is of a type that indicates percentage composition of a known gas, in a mixture of known gases, by measuring changes in the rate of thermal conductivity of the mixture.

The principal object of the invention is to provide a simple form of apparatus which will provide substantially accurate and direct measurements of percentage composition of a known gas, in a given gas stream.

A further object of the invention is to obviate the need of a closed reference gas chamber within the device, such as is usual with thermal conductivity analyzers.

There are present various types of gas analyzers, such as the Orsat type and the thermal conductivity type. The general principal of the Orsat analyzer is to absorb the gases one at a time and determine quantities from the resulting decreases in pressure. In the usual thermal conductivity type of apparatus, the type of gas is determined by comparing its rate of thermal conductivity with that of a standard reference gas. The greatest accuracy in analysis is obtained, with this latter apparatus, when the gas being analyzed is of a substantially different thermal conductivity than the reference gas.

Briefly, this invention comprises an apparatus having an elongated closed gas chamber provided with a gas inlet and a gas outlet at opposite ends thereof, a co-extending fluid conduit in heat exchange relationship with the gas chamber, electrical or other heating means of constant intensity provided to contact the wall of the gas chamber and means for indicating changes in temperature of the chamber wall at the heated point. The temperature indicating means provided may be a thermocouple or other thermo-electric device, such that the conductivity rate of the gas stream may be measured from variations in the temperature of the chamber wall. The thermal conductivity rate of the gas will in turn indicate the percentage composition of the gas stream by proper calibration of the device.

A specific simplified form of the invention comprises two concentric tubes, an annular gas passageway between the two tubes, a fluid passageway through the inner of said tubes, a substantially constant heating means contacting the outer tube, and thermocouple connections placed such that differences in heat conduction within the annular space of the device can be measured and indicated on a calibrated dial, to in turn indicate the composition of a given gas stream. The gas to be analyzed is passed through the annular space between the two tubes, while a relatively cool liquid medium such as water or oil is passed through the inner of the two concentric tubes, countercurrently to the flow of the gas stream. One thermocouple junction is made to the inner of the two concentric pipes, in order to measure temperature of the liquid medium, while a second thermocouple junction is made to the outer tube at the point where the heat is applied. Changes in temperature as indicated at the latter point or as indicated by small changes in voltage which result between the two thermocouples will provide a measure of the thermal conductivity rate for the particular gas or gas mixture passing through the annular channel. A gas of high thermal conductivity will transfer heat, from the heated portion of the outer tube to the liquid medium within the inner tube, at a faster rate than will a gas having a low thermal conductivity rate; thus with known gases the device may be calibrated and used to indicate percentage composition of one of the gases present in the given stream. The reading on a calibrated voltmeter will vary in accordance with small voltage changes effected in a thermocouple circuit connected between the cool junction and the heated junction, and the small voltage changes, of course in turn result from changes in the thermal conductivity rate of the gas stream that is being analyzed.

The device comprising this invention has been of particular advantage in connection with certain hydrocarbon conversion processes, for instance in a hydrocarbon reforming process, wherein hydrogen is employed together with certain catalysts to contact a hydrocarbon charge stream. In this process, it has been found desirable to know at all times the per cent of hydrogen present in the recycled gas stream which is charged to the reaction zone. The hydrogen, in this instance, is in admixture with principally light hydrocarbon gases such as methane and ethane. The hydrogen has a much greater thermal conductivity rate than have either methane or ethane, except at high pressures, so that variations in the amount of hydrogen present in the mixture will result in variations in the readings on a calibrated voltage indicator. Increases in the percentage of hydrogen present will be continuously indicated by decreases in E. M. F. or voltage because of the rapid heat transfer effected away from the heated outer chamber, while decreases in the quantity of hydrogen will be indicated by less rapid heat transfer and resulting increases in voltage of the thermocouple circuit. In like manner, percentage composition of some other gas, in a known mixture, may be obtained by calibrating the device for the particular gas mixture which is to be passed through the device.

The accompanying drawing and following description thereof will serve to more fully explain the construction, assembly, and operation of the apparatus, as well as point out its advantageous features.

The drawing illustrates the gas analyzing apparatus principally in a sectional elevation view. Number 1 refers to the inner tube of two concentric tubes and it is provided with an inlet end 2 and an outlet end 3 for a fluid medium to be passed through the apparatus. In operation the fluid medium passing through tube 1 may be water, oil or any other cooling medium having a substantially constant temperature. The outer tube 4 of the two concentric tubes is provided with end closures 5 which are sealed to the inner tube 1. There is thus formed an annular shaped chamber or flow channel 6 between tube 1 and tube 4. The gas stream to be analyzed is charged to this annular passageway 6 through a gas inlet 7 and through a control valve 8, with the gas being discharged through gas outlet 9 at the opposite end thereof.

A constant source of heat is applied to a portion of the wall of the outer tube 4 around the gas passageway 6. An electrical resistance heating coil 10 which connects with a constant voltage transformer 11 by means of wires 12 and 13, is preferably used to supply this constant and uniform heat source. Electrical power for the transformer 11 and the resistance heating coil 10 is supplied through line 14 and 15. A layer of insulating material 16 is provided around the heating coil 10 and the heated portion of the outer tube 4 in order to prevent varying air temperatures from adversely affecting the temperature of the tube 4 and in turn cause undesirable voltage changes in the accompanying indicating devices.

A thermocouple 17 is attached to the surface of the outer tube 4 at a point where it is heated by the coil 10. A second thermocouple 18 is attached to the inner tube 1 near the fluid inlet 2. These thermocouples 17 and 18 may be of the "skin" type which are adapted to attach to the outer surface of the tubular member or a chamber. The thermocouple 17 is connected to a temperature indicating device 19 while thermocouple 18 is connected to a temperature indicating device 20. The temperature indicator 20 will measure the temperature of the incoming fluid medium in line 1 and will serve to indicate any undesired temperature changes in the fluid medium. Temperature indicator 19 will serve to show fluctuations in the temperature of the heated junction 17 which will vary only with the thermal conductivity rate of the gas passing through the annular passageway 6, assuming a constant temperature fluid medium within tube 1. The connecting wires 21 and 22, from each of the thermocouples 17 and 18, are attached to a calibrated millivoltmeter 23 providing a direct visual means for reading voltage changes between the two junction points 17 and 18. Thus, when the voltmeter 23 has been properly calibrated it will give a direct reading of the percentage composition of the gas being analyzed within the device.

The apparatus is preferably connected in parallel with the pipe or conduit which carries the gas to be analyzed in order that a high velocity gas stream need not be passed through the device. The operating temperature and pressure of the gas stream is not particularly critical in the operation of the device with many gases; however, the device should be calibrated at the operating pressure which is to be encountered in order to obtain the greatest accuracy. The design and construction of the tubular chamber or flow channels must, of course, be such that they will withstand any anticipated pressure that will be used. Valve 8 is used primarily to regulate the velocity of the stream which is to be analyzed through the apparatus. The calibration of the millivoltmeter 23 in the apparatus may be made by charging streams of a gas mixture of known percentage compositions through the device at temperatures and pressures approximating those which will be encountered in operation. The apparatus is ready to be used, after it has been calibrated in the above mentioned manner and has been installed with the gas stream flowing in channel 6 countercurrently to the liquid stream passing through the inner tube 1. The heating coil 10 and the accompanying transformer 11 must also be connected to a suitable power supply, by means of wires 14 and 15.

In an example of the advantageous use of the apparatus, let it be assumed that the percentage composition of hydrogen in a given gas stream comprising principally hydrogen, methane and ethane is to be analyzed continuously during the operation of the previously mentioned reforming process. In this process, hydrogen is charged together with hydrocarbon reactants to a catalytic reaction chamber, from which the reaction products are withdrawn. The light gas stream containing hydrogen, methane and ethane is recycled to the chamber and since the amount of hydrogen present is quite critical, in its effect on the catalyst bed in the reaction chamber, it is necessary to constantly check and control the amount of hydrogen present, keeping it within predetermined limits. Hydrogen has a much higher thermal conductivity rate than either methane or ethane at low pressures, the rate being approximately 7 times as great as the rate of either of the latter two which are not substantially different as to their thermal conductivity rates. Thus, a continuous indication of the amount of hydrogen present, is made possible by the device of this invention, for an increase in hydrogen will cause a substantial temperature loss at the thermocouple 17 and a voltage drop across the calibrated millivoltmeter 23. In the reverse instance, a decrease in percentage of hydrogen present will effect a slower heat transfer from the heated junction 17 to the inner fluid conduit 1 and the temperature loss from the tube wall 4 as indicated by thermocouple 17 will be less than in the first assumption. Also in the latter case, the calibrated meter 23 will measure a smaller voltage drop between junctions 17 and 18, thereby indicating lesser percentage of hydrogen on the calibrated scale of the millivoltmeter.

It is not intended to limit this invention to the exact form or assembly shown, in the accompanying drawing, as it is obvious that certain mechanical substitutions and structural changes can be made in more elaborate forms of the apparatus. Also, it is not intended to limit the use of the apparatus to analyzing any one gas or to any given process, for it is obvious that gas other than hydrogen in other mixed gas streams of known gases may be analyzed for percentage composition of a desired component, in a similar manner to the example described above.

I claim as my invention:

1. An apparatus of the class described, for indicating the thermal conductivity of a gas stream, which comprises an elongated gas chamber having an inlet and an outlet at opposite ends thereof, means for regulating the flow of said stream through said chamber, a co-extensive conduit positioned in heat exchange relationship with said gas chamber and adapted to pass a fluid medium therethrough, a heating means capable of supplying a constant heat-input placed adjacent said gas chamber, temperature measuring means for said conduit, and temperature measuring means attached to said gas chamber adjacent said heating means.

2. An apparatus for indicating the thermal conductivity of a gas stream which comprises two concentric tubes, the inner of said concentric tubes, having an inlet and an outlet at opposite ends thereof, the outer tube having closed ends and being positioned around the inner of said concentric tubes to form an annular chamber, a fluid inlet connecting to one end of said annular chamber and a fluid outlet connecting to the opposite end thereof, flow regulating means for controlling the flow of gas through said chamber, a heating means capable of supplying a constant heat-input placed adjacent said outer annular chamber, temperature measuring means attached to the inner tube adjacent the inlet end thereof, and temperature measuring means attached to the heated wall of said outer concentric tube.

3. The apparatus of claim 2 further characterized in that said heating means comprises an electrical resistance coil, a constant voltage transformer connecting with said coil and an electric power supply connecting with said constant voltage transformer.

4. An apparatus for indicating the thermal conductivity of a gas stream, comprising two concentric tubes, the outer of said concentric tubes closed at each end and positioned around the inner of said concentric tubes to form an annular gas chamber, a fluid inlet and a fluid outlet to said inner tube at opposite ends thereof, an inlet and outlet to said annular gas chamber at opposite ends thereof, heating means surrounding a portion of the outer tube and capable of supplying a constant heat input, a thermocouple attached to the inlet of said inner tube, a thermocouple attached to the outer of said concentric tubes adjacent said heating means, a calibrated millivoltmeter connected between said thermocouples, and flow regulating means positioned in the inlet to said annular chamber.

5. An apparatus, for indicating the thermal conductivity of a gas stream, comprising in combination two concentric tubes, the outer of said concentric tubes closed at each end and positioned around the inner of said concentric tubes to form an annular gas chamber, an inlet conduit connecting with one end of said annular chamber and an outlet conduit connecting with the opposite end of said annular chamber, flow regulating means positioned in said inlet conduit to said annular chamber, inlet and outlet means to the inner of said concentric tubes, an electrical resistance coil encompassing a portion of the outer concentric tube and said annular gas chamber, an insulating jacket around said resistance coil and said gas chamber, a constant voltage transformer connecting with said resistance coil, a power supply connecting with said constant voltage transformer, a thermocouple attached to the inlet of said inner tube, a thermocouple attached to the outer of said concentric tubes adjacent said heating coil, and a calibrated millivoltmeter connected between said thermocouples.

HERBERT A. HULSBERG.

REFERENCES CITED

The following references are of record in the file of this patent:

UNITED STATES PATENTS

| Number | Name | Date |
|---|---|---|
| 1,260,575 | Potter | Mar. 26, 1918 |
| 1,874,520 | Hebler | Aug. 30, 1932 |
| 2,193,762 | Hirsch | Mar. 12, 1940 |
| 2,296,030 | Hall | Sept. 15, 1942 |
| 2,446,283 | Hulsberg | Aug. 3, 1948 |

FOREIGN PATENTS

| Number | Country | Date |
|---|---|---|
| 131,375 | Great Britain | Aug. 28, 1919 |